United States Patent [19]
Kashima et al.

[11] Patent Number: 5,401,796
[45] Date of Patent: Mar. 28, 1995

[54] ALIPHATIC POLYESTER AND PREPARATION PROCESS THEREOF

[75] Inventors: Takeshi Kashima; Taiji Kameoka; Chojiro Higuchi; Masanobu Ajioka; Akihiro Yamaguchi, all of Kanagawa, Japan

[73] Assignee: Mitsui Toatsu Chemicals, Inc., Tokyo, Japan

[21] Appl. No.: 219,344

[22] Filed: Mar. 29, 1994

[30] Foreign Application Priority Data

| Apr. 2, 1993 | [JP] | Japan | 5-076538 |
| Jun. 15, 1993 | [JP] | Japan | 5-143228 |
| Jun. 17, 1993 | [JP] | Japan | 5-145882 |
| Dec. 21, 1993 | [JP] | Japan | 5-321722 |

[51] Int. Cl.$^6$ ............................................. C08K 3/32
[52] U.S. Cl. ............................ 524/706; 528/272; 528/274; 528/301; 528/302; 528/485; 528/490; 524/710; 524/730; 524/755
[58] Field of Search ............. 528/272, 274, 301, 302, 528/485, 490; 524/705, 710, 730, 755

[56] References Cited

U.S. PATENT DOCUMENTS

| 5,171,308 | 12/1992 | Gallagher et al. | 604/372 |
| 5,295,985 | 3/1994 | Romesser et al. | 604/358 |
| 5,310,865 | 5/1994 | Enomoto et al. | 528/361 |

*Primary Examiner*—Samuel A. Acquah
*Attorney, Agent, or Firm*—Burns, Doane, Swecker & Mathis

[57] ABSTRACT

A preparation process of aliphatic polyester having a weight average molecular weight of 15,000 or more by conducting a direct polycondensation reaction of an aliphatic polyhydric alcohol or a mixed aliphatic polyhydric alcohol and an aliphatic polybasic acid or a mixed aliphatic polybasic acid, or additionally a hydroxycarboxylic acid or a mixed hydroxycarboxylic acid or an oligomer of the hydroxycarboxylic acid in a reaction mixture containing an organic solvent.

The aliphatic polyester thus obtained contains an extremely small amount of impurities, has low color and can exhibit satisfactory strength in the form of films, filaments and other shaped articles.

19 Claims, No Drawings

ALIPHATIC POLYESTER AND PREPARATION PROCESS THEREOF

BACKGROUND OF THE INVENTION AND RELATED ART

1. Field of the Invention

The present invention relates to a process for preparing aliphatic polyester which is a biodegradable polycondensate and is useful as a medical material and a substitute of general purpose resin by direct polycondensation of a mixture of polyhydric alcohols with polybasic acids or a blend of said mixture with hydroxycarboxylic acids, and to the aliphatic polyester prepared by said process.

Aliphatic polyester can be hydrolyzed with relative ease in the presence of water and also decomposed by microorganisms.

Aliphatic polyester can also be hydrolyzed and absorbed in a living body and thus has been focused attention as a polycondensate which can be applied to the above uses.

2. Related Art of the Invention

As widely known, processes for preparing high molecular weight polyester from polyhydric alcohols and polybasic acids are based upon a deglycolation reaction of low molecular weight polyester having terminal hydroxyl groups.

Consequently, concentration of the terminal group is drastically lowered with increase in the molecular weight. A decomposition reaction due to the concentration of the ester at the ester exchange step is also added and thus restriction is found on the molecular weight increase. The tendency is particularly dominant in aliphatic polyester. For example, it has been found that the molecular weight attains a maximum value and successively starts to decrease in the preparation of high molecular weight saturated polyester by a conventional deglycolation reaction under reduced pressure.

In such cases, it is difficult so far as depending upon the conventional deglycolation reaction to prepare aliphatic polyester having a molecular weight which is satisfactory to form a tough film. In other words, the molecular weight obtained in the aliphatic polyester was low so that it was unable to form a film having characteristics for practical use.

Japanese Laid-Open Patent Publication HEI 4-180822 and 4-189823 describe preparation processes of high molecular weight polyester comprising adding, in the molten state above the melting point, an isocyanate compound having from 0.1 to 2 equivalents of an isocyanate group for an existing hydroxyl group to saturated polyester which has a number average molecular weight of 5,000 or more, a terminal group substantially consisting of the hydroxyl group and an acid component composed of a compound having 5 or more carbon atoms or a mixture of the compound.

Japanese Laid-Open Patent HEI 5-310898 has described a preparation process of high molecular weight aliphatic polyester comprising esterifying a glycol component with an aliphatic or alicyclic dicarboxylic acid component or its anhydride component and subjecting the resultant polyesterdiol to a deglycolation reaction at 180°~230° C. in the presence of a catalyst under high vacuum of 0.005~0.1 mmHg.

U.S. Pat. No. 3,932,319 has also described a novel composition prepared by blending a naturally biodecomposed product with aliphatic polyester which has a reduced viscosity of 0.1~10 and is obtained by polymerizing at 250° C. or above under vacuum of 1 mmHg or less and successively subjecting to a transesterification reaction under ultrahigh vacuum of $10^{-3}$ mmHg or less.

However, in the preparation process of aliphatic polyester at such a high reaction temperature as above, formation of impurities and discoloration of polymers due to the impurities lead to inevitable problems. Consequently, polymers obtained by using an isocyanate compound or conducting the reaction at a high temperature or under high vacuum are difficult to use for food packaging or medical applications.

Under such circumstances, stabilizers must be added to the polymers, Japanese Laid-Open Patent HEI 6-41288 has described a process for enhancing heat stability and reducing discoloration by reacting glycol with dicarboxylic acid or its anhydride to prepare an aliphatic polyester having a number average molecular weight of 5,000 or more and/or a weight average molecular weight of 30,000 or more in the presence of a metal compound catalyst in an amount of 0.001~0.5 part by weight for 100 parts by weight of formed aliphatic polyester, adding at the end of the reaction 0.01~3 parts by weight of a phosphorus compound for 100 parts by weight of said aliphatic polyester, and successively reacting said aliphatic polyester with 0.1~5 parts by weight of a polyisocyanate compound for 100 parts by weight of said aliphatic polyester to prepare a high molecular weight polyester having a number average molecular weight of 10,000 or more and/or a weight average molecular weight of 50,000 or more.

However, an isocyanate group existing in a high molecular chain as above tends to form a very toxic amine compound in the course of degradation and to accumulate the generated compound in soil.

As to hydroxycarboxylic acid, polyhydroxycarboxylic acid has been prepared by ring-opening polymerization of a cyclic dimer. For example, polylactic acid and polyglycolic acid have been individually prepared by ring-opening polymerization of lactide and glycolide which are cyclic dimers of lactic acid and glycolic acid, respectively.

However, in order to prepare lactide or glycolide which can be suitably used for the raw material of polymer, complex procedures including distillation under reduced pressure and repeated recrystallization are required. These complex procedures for purification require great labor and are unfavorable in economy. Additionally, the ring-opening polymerization cannot be carried out in the copolycondensation of hydroxycarboxylic acid which does not form cyclic lactones such as lactide and glycolide.

On the other hand, the preparation process of a high molecular weight polycondensate by direct polycondensation has not yet been established in a two component system composed of polyhydric alcohol and polybasic acid or a three component system obtained by further addition of hydroxycarboxylic acid.

The esterification reaction of the two component system or the three component system is a successive reaction and thus molecular weight of the product increases with extended reaction time. In the course of reaction, generated water or the monomer has an action to reduce molecular weight of the polycondensate by hydrolysis.

Consequently, it has been required for providing high molecular weight polyester to remove the generated water or the excessive monomer from the reaction system.

SUMMARY OF THE INVENTION

The object of the invention is to provide a high molecular weight aliphatic polyester which does not form toxic substances by biodegradation and has sufficient strength in the form of films filaments and other shaped articles, and a preparation process of the high molecular weight aliphatic polyester by direct polycondensation of a mixture of polyhydric alcohol with polybasic acid or a blend obtained by addition of hydroxycarboxylic acid to the mixture.

That is, the aspect of the invention is a preparation process of aliphatic polyester having a weight average molecular weight of 15,000 or more comprising conducting in a reaction mixture containing an organic solvent a direct polycondensation reaction of a mixture of aliphatic polyhydric alcohol or mixed aliphatic polyhydric alcohol with aliphatic polybasic acid or mixed aliphatic polybasic acid, and the aliphatic polyester which is obtained by said preparation process and has a weight average molecular weight of 15,000 or more.

Another aspect of the invention is a preparation process of aliphatic polyester having a weight average molecular weight of 15,000 or more, comprising conducting in a reaction mixture containing an organic solvent a direct-polycondensation reaction of a blend obtained by addition of a hydroxycarboxylic acid or a mixed hydroxycarboxylic acid to a mixture of aliphatic polyhydric alcohol or a mixed aliphatic polyhydric alcohol with an aliphatic polybasic acid or a mixed aliphatic polybasic acid, and the aliphatic polyester which is obtained by said preparation process and has a weight average molecular weight of 15,000 or more.

A further aspect of the invention is a purification process of a polycondensate in the case of conducting the polycondensation reaction in the presence a catalyst, comprising removing the catalyst from the polycondensate by cooling the solution after finishing the reaction with stirring or as such and bringing the resultant solid into contact with an acidic substance in the presence of a specific organic solvent, and the polycondensate purified by said purification process.

The preparation process of the invention can provide aliphatic polyester which contains a trace amount of impurities and is useful for a biodegradable polymer. The preparation process of the invention can also provide with ease a high molecular weight aliphatic polyester which has sufficient strength in the form of films, filaments and shaped articles.

DETAILED DESCRIPTION OF PREFERRED EMBODIMENTS

In the preparation process of the invention, a polycondensation of monomers including a mixture of polyhydric alcohol with polybasic acid or a blend obtained by addition of a hydroxycarboxylic acid to the mixture is carried out in an organic solvent, and formed water and an excess monomer are distilled with the organic solvent out of the reaction system. The preparation process of the invention is preferably carried out by distilling water and the excess monomer with the organic solvent out of the reaction system during the course of the dehydration polycondensation reaction and simultaneously charging the organic solvent into the reaction system as an additional solvent. An amount of water and the monomer contained in the additional solvent is less than the amount of water and the monomer dissolved in the distilled organic solvent. The additional solvent is charged into the reaction system by recycling the distilled solvent after treatment or by using a fresh solvent. The distilled solvent can be treated by any method including drying, absorption and distillation as illustrated below.

The organic solvents which can be used for the direct dehydration polycondensation reaction of the invention include, for example, toluene, xylene, mesitylene and other hydrocarbon solvents; chlorobenzene, bromobenzene, iodobenzene, dichlorobenzene, 1,1,2,2-tetrachloroethane, p-chlorotoluene and other halogenated hydrocarbon solvents; 3-hexanone, acetophenone, benzophenone and other ketone solvents; dibutyl ether, anisol, phenetole, o-dimethoxybenzene, dimethoxybenzene, 3-methoxytoluene, dibenzyl ether, benzylphenyl ether, methoxynaphthalene and other ether solvents; methyl benzoate, dimethyl phthalate, diethyl phthalate and other ester solvents; and diphenyl ether, alkyl substituted diphenyl ethers such as di(4-methyl phenyl) ether, di(3-methyl phenyl) ether, 3-phenoxytoluene; halogen substituted diphenyl ethers such as di(4-bromophenyl phenyl) ether, di(4-chlorophenyl) ether, 4-bromophenyl phenyl phenyl ether and 4-methyl-4'-bromodiphenyl ether; alkoxy substituted diphenyl ethers such as di(4-methoxyphenyl) ether, 4-methoxyphenyl phenyl ether, di(3-methoxyphenyl) phenyl ether, 3-methoxyphenyl phenyl ether, and 4-methyl-4'-methoxydiphenyl ether; cyclodiphenyl ethers such as dibenzofuran and xanthene; and other diphenyl ether solvents. These solvents can also be used as a mixture. These solvents can be preferably distilled with water and can be separated from water with ease after condensation. Aliphatic polyester having a high average molecular weight in particular can be prepared preferably by using ether solvents, more preferably by using alkylaryl ether solvents or diphenyl ether solvent, and most preferably by using anisole, phenetole or diphenyl ether.

The solvents which can be used usually have a boiling point higher than the reaction temperature. High boiling solvents having a boiling point of 180° C. or above are preferably used. Use of the high boiling solvents can accelerate removal of water and the excess monomer from the reaction system by carrying out the reaction under reduced pressure. The amount of the solvent for use are preferably determined so as to obtain a polymer concentration of 10~80%.

In order to remove formed water and the excess monomer out of the reaction system in the preparation process of the invention, the organic solvent used can be preferably distilled by forming an azeotropic mixture with water or the excess monomer. When the azeotropically distilled organic solvent contains water and the monomer in an amount exceeding their solubility in the organic solvent, water and the monomer are removed by separation and residual organic solvent thus obtained can be returned to the reaction system. In order to further remove water and the monomer which are still dissolved in the residual organic solvent the residual solvent can be treated with a drying agent or adsorbent or distilled to reduce the content of water and the monomer and successively returned to the reaction system. Further, a fresh solvent having a low content of water and the monomer can be charged in place of the azeotropically distilled organic solvent. Alternatively, the amount of water and the monomer in the reaction system can be reduced to a prescribed level by removing water and the monomer under reduced pressure in the initial stage of the reaction, successively adding the organic solvent and removing a portion of the organic solvent from the reaction mixture which contains the organic solvent.

The subject matter of the invention is to progress the polycondensation reaction while removing water or the excess monomer by using the solvent at least in a certain stage of reaction. As an embodiment, the solvent can or cannot be azeotropically distilled with water or the monomer, and also can or cannot be separated from water or the monomer.

A process for carrying out dehydration and monomer removal by previously charging an excess solvent and than simply taking out the solvent and a process for carrying out drying and monomer removal by replacing the reaction solvent with another solvent are also included as other embodiments of the invention. As a further modification of the embodiment, water and the monomer can be removed by an absorption agent or a drying agent.

The reaction temperature of the invention can be permitted so long as the prescribed temperature is maintained even though boiling point of the solvent is reduced due to the azeotropic distillation with water or the monomer.

The average molecular weight of aliphatic polyester depends upon the kind of the organic solvent and the content of water and the monomer in the organic solvent to be charged into the reaction system. When the solvent has a high water or monomer content of 400~500 ppm, resultant aliphatic polyester has a weight average molecular weight of 15,000~50,000. It is surprising that, even though the water or monomer content is high as above, aliphatic polyester having a weight average molecular weight of 40,000~50,000 can be obtained by using a diphenyl ether solvent. In order to prepare an aliphatic polyester having an extremely high average molecular weight, low content of water and the monomer in the organic solvent is desired in the reaction system. The content of water and the monomer to be charged can be reduced to 50 ppm or less by treating the azeotropically distilled organic solvent with a drying agent or adsorbent to eliminate or reduce water and the monomer and successively returning the treated solvent to the reaction system or by charging a fresh organic solvent having low content of water and the monomer. By conducting these procedures, aliphatic polyester having an weight average molecular weight of 50,000~400,000 can be obtained.

Exemplary drying agents or adsorbents which can be used for the preparation of aliphatic polyester having a high average molecular weight in the preparation process of the invention include molecular sieve 3A, molecular sieve 4A, molecular sieve 5A, molecular sieve 13X and other molecular sieves; alumina, silica gel, calcium chloride, calcium sulfate, diphosphorus pentaoxide, concentrated sulfuric acid, magnesium perchlorate, barium oxide, calcium oxide, potassium hydroxide and sodium hydroxide; calcium hydride, sodium hydride, lithium aluminum hydride and other metal hydrides; and sodium and other alkali metals.

Molecular sieves are preferably used in view of ease in handling and regeneration. When importance is particularly put on dehydration, molecular sieve 3A is preferred. When importance is placed on monomer removal, for example, elimination of ethylene glycol, molecular sieve 5A is preferred.

The reaction temperature in the preparation process of the invention is determined in view of a polymer forming rate and a heat decomposition rate of the polymer formed and is preferably in the range of 80°~200° C., more preferably 110°~170° C. The polycondensation reaction is usually carried out at the distillation temperature of the organic solvent under atmospheric or reduced pressure. When a high boiling organic solvent is used in order to maintain the reaction temperature in a preferred range, the reaction can be carried out under reduced pressure. On the other hand, when a low boiling organic solvent is used, the reaction can be carried out under increased pressure.

Polyhydric alcohols which can be used in the invention have aliphatic hydroxyl groups and include, for example, ethylene glycol, diethylene glycol, triethylene glycol, polyethylene glycol, propylene glycol, dipropylene glycol, 1,3-butanediol, 1,4-butanediol, 3-methyl-1,5-pentanediol, 1,6-hexanediol, 1,9-nonanediol, neopentyl glycol, polytetramethylene glycol, 1,4-cyclohexanedimethanol and 1,4-benzenedimethanol.

Polybasic acids which can be used in the invention have aliphatic carboxyl groups. Exemplary polybasic acids include succinic acid, oxalic acid, malonic acid, glutaric acid, adipic acid, pimelic acid, suberic acid, azelaic acid, suberic acid, undecanedioic acid, dodecanedioic acid, phenylsuccinic acid and 1,4-phenylenediacetic acid.

Lactic acid is preferably used in the hydroxycarboxylic acid of the invention. Other exemplary hydroxycarboxylic acids include glycolic acid, 3-hydroxybutyric acid, 4-hydroxybutyric acid, 3-hydroxyvaleric acid, 5-hydroxyvaleric acid and 6-hydroxycaproic acid.

In the case of having an asymmetric carbon atom in a molecule, D-isomer and L-isomer can be used singly. A mixture of D- and L-isomer can also be used.

The reaction of the invention can progress in the presence or absence of a catalyst. However, the catalyst is usually used in order to accelerate the reaction rate. Exemplary catalysts which can be used include metals, metal oxides and metal salts of the group II, III, IV and V in the periodic table. These catalysts include, for example, zinc powder, tin powder, aluminum, magnesium, titanium, germanium and other metals; tin oxide, antimony oxide, zinc oxide, aluminum oxide, magnesium oxide, titanium oxide and other metal oxides; stannous chloride, stannous bromide, stannic bromide, antimony fluoride, zinc chloride, magnesium chloride, aluminum chloride and other metal halides; tin sulfate, zinc sulfate, aluminum sulfate and other metal sulfates; magnesium carbonate, zinc carbonate and other metal carbonates; tin acetate, tin octoate, tin lactate, zinc acetate, aluminum acetate and other metal organic carboxylates; tin trifluoromethanesulfonate, zinc trifuoromethanesulfonete, magnesium trifluoromethanesulfonate, tin methanesulfonate, tin p-toluenesulfonate and other metal organic sulfonates; dibutyltin oxide and other organic metal oxides of these metals; titanium isopropoxide and other metal alkoxides of these metals; diethylzinc and other alkyl metals of these metals; and Dowex ® and Amberlite ® and other ion exchange resins.

The amount of the catalyst is usually 0.0001~10 weight %, preferably 0.001~2 weight % for the total amount of aliphatic polyhydric alcohol, aliphatic polybasic acid and hydroxycarboxylic acid or the amount of the oligomer of these compounds.

The preparation process of the invention is preferably carried out in an inert atmosphere. The reaction can be carried out while substituting with the inert gas or bubbling the inert gas.

Polycondensation reaction of the invention can be carried out by a continuous operation, batch operation or semibatch operation. Dehydration of solvent, monomer removal and charge of solvent can also be synchronized with these operations.

In the preparation process of the invention, water generated by the reaction and an excess monomer are distilled with an organic solvent out of the reaction system in the course of reaction. The reaction, however, can be more preferably progressed while distilling formed water, excess monomer and the organic solvent out of the reaction system and at the same time charging to the reaction system an organic solvent containing the same or less amount of water and the monomer as compared with the distilled organic solvent. A preferred examples of the embodiments will be illustrated below by using ethylene glycol and succinic acid as raw material monomers.

To a reaction vessel equipped with a water separator, for example, a Dean Stark trap, a prescribed amount of raw material monomers, that is, ethylene glycol, succinic acid and lactic acid are charged together with an organic solvent and a catalyst. The reaction vessel is heated and the organic solvent and water are azeotropically distilled into water separator. Water which is contained exceeding the solubility of the organic solvent is separated from the organic solvent in the separator and discharged from the system. The water saturated organic solvent thus obtained is returned to the reaction vessel. Ethylene glycol, succinic acid and lactic acid are converted to an oligomer in the step. The oligomer in the step has a weight average molecular weight of 500~1,000 and the molecular weight can be increased to about 5,000. The reaction time is from 0.5 hour to several hours.

The oligomerization reaction can also be carried out previously in a separate vessel under reduced pressure and in the absence of a solvent and a catalyst, or carried out by using the solvent without catalyst. The reaction can be continued as such at the distillation temperature of the solvent while removing water which is formed with progress of the reaction and returning the water saturated solvent to the reaction system. Such procedures, however, can merely provide a polycondensate having a weight average molecular weight of 15,000~50,000 depending upon the kind of solvent, even though the reaction is continued for several dozens of hours.

In order to obtain a polycondensate having a higher molecular weight, the water separator is removed after almost distilling water out of the raw materials and a tube packed with a drying agent or a an absorbing agent such as molecular sieve is mounted on the reaction vessel so as to return the distilled solvent to the reaction vessel by way of the tube. The distilled solvent can also be treated in a separate vessel charged with a drying agent or an absorbing agent and successively returned to the reaction vessel. Alternatively, a fresh solvent having a low water content and a low monomer content such as ethylene glycol can also be charged to the reaction vessel. The amount of water and monomer such as ethylene glycol dissolved in the organic solvent can be reduced to 50 ppm or less by these procedures. By continuing the reaction as such for dozens of hours, a copolycondensate having a weight average molecular weight of 50,000~400,000 can be obtained depending upon the kind of solvent.

No particular restriction is imposed upon the post-treatment procedures for isolating the desired copolycondensate after finishing the reaction. For example, the desired copolycondensate can be obtained by adding chloroform to the reaction mass, heating the resultant mixture, successively pouring the mixture into acetone, and filtering and drying precipitated crystals.

In the case of conducting the polycondensation reaction in the presence of excess ethylene glycol, water generated in the reaction and excess ethylene glycol are distilled with a solvent out of the reaction system, both dehydration and monomer removal are carried out at the same time by using molecular sieve, the solvent having a content less than the specified value of water and the monomer is returned to the reaction system. The higher molecular weight copolycondensate can be obtained by such procedures.

The weight average molecular weight of aliphatic polyester obtained by the preparation process of the invention can be broadly varied depending upon reaction conditions such as the kind of solvent, kind and amount of catalyst, reaction temperature, reaction time and procedures for treating azeotropically distilled solvent, and is usually in the range of 15,000~400,000.

It is particularly surprising that an aliphatic polyester having a weight average molecular weight of 50,000 or more, having Hazen number of 100 or less and having substantially no color, can be obtained with ease by the direct reaction process of the invention. According to the present invention, the conventional technique using an isocyanate by which a polyester is made high molecular weight is not required and the reaction condition such as high temperature and high vacuum is not needed, and hence, the present invention has an industrial advantage.

In the case of conducting the polycondensation reaction of the invention in the presence of a catalyst, the residual catalyst in the polycondensate gives adverse effect on the heat stability and weatherability of the polycondensate. Consequently, the residual catalyst in the polycondensate must be removed in some uses. It is preferred as a catalyst removing procedure to cool the reaction mass of polycondensation with stirring or as such and bring the resulting powder into contact with an acidic substance in the presence of a hydrophilic organic solvent.

The hydrophilic organic solvents which can be used for the procedure include, for example, methanol, ethanol, isopropyl alcohol, butyl alcohols; acetone, methyl ethyl ketone and other ketones; tetrahydrofuran, dioxane and other ethers; acetic acid, butyric acid and other carboxylic acids; acetonitrile and other nitriles; and N,N-dimethylformamide, N,N-dimethylacetamide, 1,3-dimethylimidezolidinone, hexamethylphosphoramide and other amides. Alcohols are particularly preferred in view of low price and insolubility of the polycondensate.

Exemplary acidic substances include hydrochloric acid, sulfuric acid, nitric acid, phosphoric acid and other inorganic acids; and acetic acid, p-toluenesulfonic acid and other organic acids. Inexpensive acids such as hydrochloric acid, sulfuric acid and nitric acid are preferred in particular.

The amount of the acidic substance is in the range of 0.0001~5.0 moles, preferably 0.001~1.0 mole for 100 parts by weight of the polycondensate. When the amount is less than 0.0001 mole, good effect cannot be obtained on the catalyst removal. On the other hand, the amount more than 5.0 moles leads to problems such as deterioration of the polycondensate in some cases.

The morphology of the solid polycondensate used for the catalyst removal is powder, granule, flake and block. Such morphology is usually prepared by once dissolving the polycondensate in a good solvent and then dropwise adding a lean solvent to the resulting solution or pouring the solution into the lean solvent, or by dissolving the polycondensate in a specific solvent with heating and then cooling the resulting solution to crystallize the polycondensate.

Polycondensate thus obtained has a bulk density of preferably 0.60 g/ml or less, more preferably 0.05~0.5 g/ml. When the bulk density is higher than 0.60 g/ml, contact with the acidic substance becomes insufficient and the residual catalyst in the polycondensate cannot be fully removed. On the other hand, bulk density lower than 0.05 g/ml causes no problem at all on the catalyst removal, whereas leads to operational problems because filterability of the polycondensate is impaired by the treatment.

Polycondensate is brought into contact with the acidic substance under conditions such as a solid concentration of preferably 3~40 weight % in the hydrophilic, organic solvent; contact temperature of preferably 0°~100° C., more preferably 0°~60° C.; and contact time of preferably 0.1~24 hours, more preferably 0.5~8 hours.

The high molecular weight aliphatic polyester thus obtained exhibits satisfactory strength and toughness when processed into films and shaped articles, and can be applied to uses such as containers. When a film is formed by using the polycondensate prepared by the process of the invention in particular, a weight average molecular weight lower than 50,000 leads to insufficient tensile strength and elongation and it is hence difficult to put the film into practical use. Consequently, in the case of using the polycondensate for the preparation of a film, the polycondensate is required to have a weight average molecular weight of 50,000 or more, preferably 70,000 or more, more preferably 100,000 or more. Aliphatic polyester having a suitable molecular weight for the preparation of the film can be obtained with ease by the preparation process of the invention. Further, the high molecular weight aliphatic polyester can be subjected to fabrication such as stretching, blowing and vacuum forming.

Consequently, the high molecular weight aliphatic polyester obtained by the process of the invention can be used as a medical material and a substitute for conventional general purpose resins such as foams and nets.

EXAMPLE

The present invention will hereinafter be illustrated by way of examples. However, these examples are not to be construed to limit the scope of the invention.

The weight average molecular weight of aliphatic polyester of the invention was measured by gel permeation chromatography (column temperature 40° C., chloroform solvent) using a polystyrene standard sample as the reference.

The water content in the solvent was measured with a Karl Fischer's moisture meter MRC-210, manufactured by Kyoto Denshi gogyo Co. Ltd. Ethylene glycol or 1,4-butanediol content in a distilled solvent was measured by HPLC (elution solvent: 0.1% of sodium heptanesulfonate soln.).

Metal content in the polymer was measured by fluorescent X-ray spectroscopy.

Hue of the polymer was measured in the molten state and shown in a Hazen number unit (APHA).

EXAMPLE 1

To a mixture of 20.1 g of ethylene glycol and 38.2 g of succinic acid, 0.208 g of metallic tin was added and oligomerized by heating at 140° C. for 9 hours with stirring under 1 atmosphere while distilling water out of the reaction system. To the resulting mixture, 87.9 g of diphenyl ether was added. A tube was packed with 10 g of molecular sieve 5A and mounted on the reaction vessel so as to return the distilled solvent to the reaction vessel after passing through the molecular sieve layer. Thereafter the reaction was carried out at 150° C. for 4.5 hours under reduced pressure of 36 mmHg. To the resulting liquid, 0.960 g of metallic tin was added and stirred at 150° C. for 25 hours under reduced pressure of 36 mmHg. Before finishing the reaction, a small amount of sample was collected from the distilled solvent at a location between the outlet of the molecular sieve layer and the returning inlet of the reaction vessel. As a result of analysis, the solvent had a water content of 5 ppm or less and the ethylene glycol content was less than the detection limit of 10 ppm. The reaction mass was dissolved in 500 ml of chloroform, and poured into 5.8 liters of acetone. The reprecipitated mass was dried at 60° C. for 6 hours under reduced pressure to obtain polyethylene succinate. Polyethylene succinate had a weight average molecular weight of 68,000.

Polyethylene succinate thus obtained was fused at 200° C. and hue was measured in the molten state. Polyethylene succinate had a Hazen number of 100 or less.

EXAMPLE 2

To a mixture of 20.0 g of ethylene glycol and 47.1 g of adipic acid, 0.205 g of metallic tin was added and oligomerized by heating at 140° C. for 7.5 hours with stirring under 1 atmosphere while distilling water out of the reaction system. A Dean Stark trap was then mounted on the reaction vessel, and 87.5 g of diphenyl ether and 2.129 g of metallic tin were added to the reaction mixture. An azeotropic dehydration reaction was then carried out at 150° C. for 2.5 hours under reduced pressure of 38 mmHg to remove water from the reaction mixture. Thereafter the Dean Stark trap was removed and a tube which was packed with 10 g of molecular sieve 3A was mounted on the reaction vessel so as to return the distilled solvent to the reaction vessel after passing through the molecular sieve layer. The reaction was further continued at 150° C. for 23 hours. Before finishing the reaction, a small amount of sample was collected from the distilled solvent at a location between the outlet of the molecular sieve layer and the returning inlet of the reaction vessel. As a result of analysis, the solvent had a water content of 5 ppm or less and the ethylene glycol content was less than the detection limit of 10 ppm. The reaction mass was dissolved in 500 ml of chloroform and poured into 5.8 liters of acetone. The reprecipitated mass dried at 60° C. for 6 hours under reduced pressure to obtain polyethylene adipate having a weight average molecular weight of 67,000. Polyethylene succinate thus obtained was fused at 200° C. and hue was measured in the molten state. Polyethylene succinate had a Hazen number of 100 or less.

EXAMPLE 3

To a mixture of 20.0 g of ethylene glycol and 38.1 g of succinic acid, 207.0 g of diphenyl ether and 0.931 g of metallic tin were added and oligomerized heating at 130° C. for 7 hours with stirring under reduced pressure of 140 mmHg while distilling water out of the reaction system. The reaction vessel was then equipped with a Dean Stark trap and an azeotropic dehydration reaction was carried out at 140° C. for 8 hours under reduced pressure of 30 mmHg. Thereafter the Dean Stark trap was removed from the reaction vessel and a tube which was packed with 20 g of molecular sieve 3A was mounted so as to return distilled solvent to the reaction system after passing through the molecular sieve layer. The reaction was further continued at 130° C. for 49 hours under reduced pressure of 17 mmHg. Before finishing the reaction, a small amount of sample was collected from the distilled solvent at a location between the outlet of the molecular sieve layer and the returning inlet of the reaction vessel. As a result of analysis, the solvent had a water content of 5 ppm or less and the ethylene glycol content was less than the detection limit of 10 ppm. The resultant reaction mass was dissolved in 400 ml of chloroform and poured into 3 liters of acetone. The reprecipitated mass was dried at 60° C. for 6 hours under reduced pressure. Polyethylene succinate thus obtained had a weight average molecular weight of 124,000. Polyethylene succinate thus obtained was fused at 200° C. and hue was measured in the molten state. Polyethylene succinate had a Hazen number of 100 or less.

EXAMPLE 4

To a mixture of 20.0 g of ethylene glycol and 38.1 g of succinic acid, 207.0 g of diphenyl ether and 0.931 g of metallic tin were added.

A Dean Stark trap was mounted on the reaction vessel and the reaction was carried out by heating at 130° C. for 7 hours with stirring under reduced pressure of 140 mmHg while distilling water out of the reaction system. The oligomer thus obtained was further reacted by heating at 130° C. for 40 hours with stirring under reduced pressure of 15 mmHg. Polyethylene succinate having a weight average molecular weight of 43,000 was obtained.

EXAMPLE 5

To a mixture of 20.0 g of ethylene glycol and 38.1 g of succinic acid, 207.0 g of anisole and 0.931 g of metallic tin were added. A Dean Stark trap was mounted on the reaction vessel and the reaction was carried out at 154° C. for 15 hours with stirring. Thereafter the Dean Stark trap was replaced by a tube which was packed with 20 g of molecular sieve 3A so as to return the distilled solvent to the reaction vessel by way of the molecular sieve layer. The reaction was further continued at 130° C. for 35 hours with stirring. Polyethylene succinate thus obtained had a weight average molecular weight of 59,000.

COMPARATIVE EXAMPLE 1

To a mixture of 20.0 g of ethylene glycol and 38.1 g of succinic acid, 0.931 g of metallic tin was added. A Dean Stark trap was mounted on the reaction vessel. Oligomerization was carried out at 130° C. for 7 hours with stirring under reduced pressure of 140 mmHg while distilling water out of the reaction system. Thereafter stirring was continued at 130° C. for 40 hours under reduced pressure of 15 mmHg. Polyethylene succinate thus obtained had a weight average molecular weight of 10,000.

REFERENCE EXAMPLE 1

The polymer having a weight average molecular weight of 124,000, which was obtained in Example 3, was pressed at 170° C. for 5 minutes in a compression molding machine and successively cooled to 40° C. for 5 minutes. A translucent film having a thickness of 100 a m was obtained. The film had a tensile yield strength of 270 kg/cm$^2$ and an elongation at break of 500% or more.

REFERENCE EXAMPLE 2

The film which was obtained in Reference Example 1 and had a thickness of 100 $\mu$m was superimposed with a wood free paper having a basis weight of 65.5 g/m$^2$ and adhered by pressing at 170° C. for 5 minutes under pressure of 30 kg/cm$^2$ in a compression molding machine. A coated paper having good surface gloss was obtained. The coated paper was soft and flexible and the polymer film was not broken even though the coated paper was folded.

EXAMPLE 6

To a mixture of 20.2 g of ethylene glycol, 38.5 g of succinic acid and 7.3 g of lactic acid, 123 g of diphenyl ether and 0.66 g of a metallic tin catalyst were added and oligomerized by heating at 125° C. for 9 hours with stirring under reduced pressure of 140 mmHg while distilling off water from the reaction vessel. Thereafter a Dean Stark trap was mounted on the reaction vessel and a dehydration reaction was carried out at 140° C. for 3 hours under reduced pressure of 15 mmHg while removing wearer by azeotropic distillation. Thereafter the Dean Stark trap was removed and a tube which was packed with 20 g of molecular sieve 3A was mounted on the reaction vessel so as to return the distilled solvent to the reaction vessel after passing through the molecular sieve layer. The reaction was further conducted at 130° C. for 33 hours under reduced pressure of 13 mmHg. After finishing the reaction, the reaction mass was dissolved in 720 ml of acetonitrile and 300 ml of a 1N aqueous HCl solution was added. The mixture was stirred for 0.5 hour, mixed with 320 ml of IPA and successively poured into 4.5 liters of methanol. The reprecipitated mass was washed with 3 liters of n-hexane and dried under reduced pressure. The tin catalyst content in the polymer had been reduced to 10 ppm or less. The yield was 60° C. and the polymer had a weight average molecular weight of 147,000. The polymer was hydrolyzed at 100° C. for 10 hours in a 5N aqueous NaOH solution. As a result, it was confirmed that the polymer contained ethylene glycol, succinic acid and lactic acid in the proportion used.

EXAMPLE 7

To a mixture of 20.0 g of ethylene glycol, 47.1 g of adipic acid and 7.2 g of lactic acid, 0.228 g metallic tin was added and oligomerized by heating at 140° C. for 7.5 hours with stirring under pressure of 1 atmosphere while distilling water out of the reaction system. Thereafter a Dean Stark trap was mounted on the reaction vessel, 98 g of diphenyl ether and 2.366 g of metallic tin were added, and water was distilled off by carrying out an azeotropic dehydration reaction at 150° C. for 2.5 hours under reduced pressure of 38 mmHg. Thereafter the Dean Stark trap removed and a tube which was packed with 20 g of molecular sieve 3A was mounted on the reaction vessel so as to return the distilled solvent to the reaction vessel after passing through the molecular sieve layer. After reacting at 150° C. for 23 hours, the reaction mass was dissolved in 600 ml of chloroform and poured into 6.0 liters of acetone. The reprecipitated mass was dried at 60° C. for 6 hours under reduced pressure to obtain a copolymer. The copolymer thus obtained had a weight average molecular weight of 08,000.

EXAMPLE 8

To a mixture of 24.5 g of propylene glycol, 38.1 g of succinic acid and 14.4 g of lactic acid, 260 g of diphenyl ether and 1.163 g of metallic tin were added and oligomerized by heating at 130° C. for 7 hours with stirring reduced pressure of 140 mmHg while distilling water out of the reaction system. Thereafter a Dean Stark trap was mounted on the reaction vessel and an azeotropic dehydration reaction was carried out at 140° C. for 8 hours under reduced pressure of 30 mmHg. Successively the Dean Stark trap was removed and a tube packed with 20 g of molecular sieve 3A was mounted on the reaction vessel so as to return the distilled solvent to the reaction vessel after passing through the molecular sieve layer. Stirring was further continued at 130° C. for 41 hours under reduced pressure of 17 mmHg. After finishing the reaction, the reaction mass was dissolved in 600 ml of chloroform and poured into 4 liters of acetone. The reprecipitated mass was dried at 60° C. for 6 hours under reduced pressure. The polymer thus obtained had a weight average molecular weight of 124,000.

EXAMPLE 9

To a reaction vessel equipped with a Dean Stark trap, 17.2 g of ethylene glycol, 26.6 g of succinic acid and 0.162 g of metallic tin were charged. The mixture was oligomerized by heating with stirring at 150° C. for 7 hours, successively for 4 hours under reduced pressure of 10 mmHg and for 4 hours under reduced pressure of 2 mmHg, while distilling water and excess ethylene glycol out of the reaction system.

Thereafter 97 g of diphenyl ether was charged and the Dean Stark trap was replaced by a tube which was packed with 20 g if molecular sieve 5A so as to return the distilled solvent to the reaction vessel after passing through the molecular sieve layer. The reaction was further continued with stirring at 130° C. for 30 hours under reduced pressure of 17 mmHg. The reaction mass was dissolved in 400 ml of chloroform, filtered and poured into 3 liters of acetone. The reprecipitated mass was isolated by filtration and dried at 60° C. for 6 hours. The polymer thus obtained had a weight average molecular weight of 130,000.

EXAMPLE 10

To a mixture of 20.0 g of ethylene glycol and 38.1 g of succinic acid, 207.0 g diphenyl ether and 0.931 g of metallic tin were added and oligomerized by heating at 130° C. for 7 hours with stirring under reduced pressure of 140 mmHg while distilling water out of the reaction system. Thereafter a Dean Stark trap was mounted on the reaction vessel and an azeotropic dehydration reaction was carried out at 140° C. for 8 hours under reduced pressure of 30 mmHg. The Dean Stark trap was removed and a tube which was packed with 20 g of molecular sieve 3A was mounted on the reaction vessel so as to return the distilled solvent to the reaction vessel after passing through the molecular sieve layer. The reaction was further conducted at 130° C. for 49 hours with stirring under reduced pressure of 17 mmHg. The reaction mass was dissolved in 400 ml of chloroform and poured into 3 liters of acetone. The reprecipitated mass was sludged three times each for 0.5 hours with a 0.7 wt % HCl solution in IPA, washed with IPA and dried at 60° C. for 6 hours under reduced pressure. Tin catalyst content in the polymer had been reduced to 10 ppm or less. The polymer thus obtained had a weight average molecular weight of 120,000.

EXAMPLE 11

To a mixture of 50.5 g of 1,4-butanediol and 66.5 g of succinic acid, 293.0 g of diphenyl ether and 2.02 g of metallic tin were added and oligomelized by heating at 130° C. for 7 hours with stirring under reduced pressure of 140 mmHg while distilling water out of the reaction system. A Dean Stark trap was mounted on the reaction vessel and an azeotropic dehydration reaction was carried out at 140° C. for 8 hours under reduced pressure of 30 mmHg. Thereafter the Dean Stark trap was removed and a tube which was packed with 40 g of molecular sieve 3A was mounted on the reaction vessel so as to return the distilled solvent to the reaction vessel after passing through the molecular sieve layer. The reaction was further continued at 130° C. for 49 hours with stirring under reduced pressure of 17 mmHg. After finishing the reaction, the reaction mass was dissolved in 600 ml of chloroform and poured into 4 liters of acetone. The reprecipitated mass was sludged three times each for 0.5 hour, washed with IPA and then dried at 60° C. for 6 hours under reduced pressure. The tin catalyst in the polymer had been reduced to 10 ppm or less. The polymer thus obtained had a weight average molecular weight of 118,000.

EXAMPLE 12

To 21.1 g of ethylene glycol and 38.1 g of succinic acid, 26 mg of stannous oxide was added and the mixture was heated with stirring from the room temperature to 150° C. during an hour under atmospheric pressure while distilling water out of the reaction system by ventilating nitrogen at a rate of 0.5 l/min. The reaction was carried out as such for 6 hour. Oligomerization was conducted by further reacting at 150° C. for 8 hours under reduced pressure of 15 mmHg. To the reaction mixture, 140 g of diphenyl ether was added. A tube packed with 20 g molecular sieve 3A was mounted on the reaction vessel so as to return the distilled solvent to the reaction vessel after passing through the molecular sieve layer. Thereafter stirring was continued at 130° C. for 15 hours under reduced pressure of 13 mmHg. Before finishing the reaction, a small amount of sample was collected from the distilled solvent at a location between the outlet of the molecular sieve layer and the inlet of the reaction vessel. As a result of analysis, the solvent had a water content of 5 ppm or less and the ethylene glycol content was less than the detection limit of 10 ppm. The reaction mass was successively dissolved in 500 ml of chloroform and the resulting solution was poured into 5.8 liters of acetone. The reprecipitated mass was dried at 60° C. for 6 hours under reduced pressure to obtain polyethylene succinate having a weight average molecular weight of 189,000. Polyethylene succinate thus obtained was fused at 200° C. and hue was measured in the molten state. Polyethylene succinate had a Hazen number of 100 or less.

EXAMPLE 13

To 22.0 g of ethylene glycol and 49.4 g of adipic acid, 27 mg of stannous oxide was added and the mixture was heated with stirring from the room temperature to 150° C. during an hour under atmospheric pressure while distilling water out of the reaction system by ventilating nitrogen at a rate of 0.5 l/min. The reaction was carried out as such for 6 hours. Oligomerization was conducted by further reacting at 150° C. for 8 hours under reduced pressure of 15 mmHg. To the reaction mixture, 87.5 g of diphenyl ether was added. A tube packed with 20 g of molecular sieve 5A was mounted on the reaction vessel so as to return the distilled solvent to the reaction vessel after contact with the molecular sieve. Thereafter the reaction was carried out at 130° C. for 13 hours under reduced pressure of 13 mmHg. Before finishing the reaction, a small amount of sample was collected from the distilled solvent at a location between the outlet of the molecular sieve layer and the inlet of the reaction vessel. As a result of analysis, the solvent had a water content of 5 ppm or less and the ethylene glycol content was less than the detection limit of 10 ppm. The reaction mass was successively dissolved in 500 ml of chloroform and the resulting solution was poured into 5.8 liters of acetone. The reprecipitated mass was dried at 60° C. for 6 hours under reduced pressure to obtain polyethylene adipate having a weight average molecular weight of 197,000. Polyethylene adipate thus obtained was fused at 200° C. and hue was measured in the molten state. Polyethylene adipate had a Hazen number of 100 or less.

EXAMPLE 14

To 30.5 g of 1,4-butanediol and 38.1 g of succinic acid, 166 g of diphenyl ether and 0.931 g of metallic tin were added. The mixture was heated with stirring from the room temperature to 150° C. during an hour under atmospheric pressure while distilling water out of the reaction system by ventilating nitrogen at a rate of 0.5 l/min. Oligomerization was carried out by heating as such for 14 hours. Thereafter a tube packed with 20 g of molecular sieve 5A was mounted on the reaction vessel so as to return the distilled solvent to the reaction system after passing through the molecular sieve layer. The reaction was further continued at 130° C. for 35 hours under reduced pressure of 13 mmHg. Before finishing the reaction, a small amount of sample was collected from the distilled solvent at a location between the outlet of the molecular sieve layer and the inlet of the reaction vessel. As a result of analysis, the solvent had a water content of 5 ppm or less and the content of 1,4-butanediol was less than the detection limit of 10 ppm. The reaction mass was dissolved in 645 g of diphenyl ether at 85° C. and cooled to the room temperature. The precipitated crystals were filtered and sludged three times with 645 g of isopropyl alcohol and dried at 60° C. for 6 hours under reduced pressure to obtain purified polybutylene succinate having a weight average molecular weight of 225,000. Polybutylene succinate thus obtained was fused at 200° C. and hue was measured in the molten state. Polybutylene succinate had a Hazen number of 100 or less.

EXAMPLE 15

To 18.9 g of ethylene glycol and 34.25 g of succinic acid, 0.210 g of metallic tin was added. The mixture was heated with stirring from the room temperature to 150° C. during an hour under atmospheric pressure while distilling water out of the reaction system by ventilating nitrogen at a rate of 0.5 l/min. The reaction was carried out as such for 6 hours. A Dean Stark trap was mounted on the reaction vessel and 155 g of diphenyl ether was added to the reaction mixture. Water was removed from the reaction system by conducting an azeotropic dehydration reaction at 150° C. for 8 hours under reduced pressure of 38 mmHg. Thereafter the Dean Stark trap was removed and a tube packed with 20 g of molecular sieve 5A was mounted on the reaction vessel so as to return the distilled solvent to the reaction system after passing through the molecular sieve layer. The reaction was further continued at 130° C. for 34 hours. Before finishing the reaction, a small amount of sample was collected from the distilled solvent at a location between the outlet of the molecular sieve layer and the inlet of the reaction vessel. As a result of analysis, the solvent had a water content of 5 ppm or less and the ethylene glycol content was less than the detection limit of 10 ppm. The reaction mass was successively dissolved in 500 ml of chloroform and poured into 5.8 liters of acetone. The reprecipitated mass was dried at 60° C. for 6 hours under reduced pressure to obtain a polycondensate having a weight average molecular weight of 139,000. The polycondensate thus obtained was fused at 200° C. and hue was measured in the molten state. The polycondensate had a Hazen number of 100 or less.

COMPARATIVE EXAMPLE 2

The interior of a 300 ml round bottomed flask was substituted with nitrogen and thereafter charged with 20.0 g of 1,4-butanediol and 22.4 g of succinic acid. The mixture was heated under nitrogen ventilation. A dehydration polycondensation reaction was carried out at 190°~220° C. for 3.5 hours under nitrogen atmosphere and successively for 3.5 hours under reduced pressure of 20~2 mmHg. Thereafter 3.4 g of a titanium tetraisopropoxide catalyst (0.01 part for 100 parts of the polycondensate) was added to the reaction mixture in a nitrogen atmosphere under atmospheric pressure. The reaction was further continued at 215°-220° C. for 4.5 hours under reduced pressure of 15~0.2 mmHg. Deglycolation reaction was successively conducted for 4 hour under high vacuum of 0.02 mmHg. The reaction mass was extruded from the reaction vessel with nitrogen pressure and dried at 90° C. for 6 hours in vacuum. Polybutylene succinate thus obtained had a weight average molecular weight of 155,000. The polybutylene succinate was fused at 200° C. Hue was measured in the molten state and a Hazen number of 500 was obtained.

We claim:

1. A preparation process of an aliphatic polyester having a weight average molecular weight of 15,000 or more, comprising using a monomer composition as a raw material of
    (i) a mixture of an aliphatic polyhydric alcohol and an aliphatic polybasic acid or
    (ii) a mixture of an aliphatic polyhydric alcohol, an aliphatic polybasic acid and a hydroxycarboxylic acid, and carrying out a polycondensation reaction of said monomer composition in an organic solvent.

2. A preparation process of claim 1 wherein a portion or more of the organic solvent containing water or the monomer is removed from a reaction mixture and an additional organic solvent having a content which is same as or less than the content of water and the monomer in the removed organic solvent is charged to the reaction mixture.

3. A preparation process of claim 2 wherein the organic solvent removed from the reaction mixture is brought into contact with a treatment selected from the group consisting of a drying agent, adsorbent and a mixture of these agents to remove water and the excess monomer, and is successively returned to the reaction mixture as the additional solvent.

4. A preparation process of claim 3 wherein the drying agent is a molecular sieve, diphosphorus pentoxide or a metal hydride.

5. A preparation process of claim 3 wherein the adsorbent is a molecular sieve.

6. A preparation process of claim 3 wherein the additional organic solvent charged to the reaction mixture contains 50 ppm or less of water and the monomer.

7. A preparation process of claim 2 wherein water is initially removed from the reaction mixture by azeotropic distillation and successively a portion of the organic solvent is removed from the reaction mixture.

8. A preparation process of claim 1 wherein the organic solvent is selected from the group consisting of an ether solvent, a diphenyl ether solvent and a mixture of these solvents.

9. A preparation process of claim 1 wherein the organic solvent, is selected from the group consisting of anisole, phenetole, diphenyl ether and a mixture of these solvents.

10. A preparation process of claim 1 wherein the polyhydric alcohol is an aliphatic diol.

11. A preparation process of claim 10 wherein the aliphatic diol is ethylene glycol or 1,4-butanediol.

12. A preparation process of claim 1 wherein the polybasic acid is an aliphatic dicarboxylic acid.

13. A preparation process of claim 12 wherein the aliphatic dicarboxylic acid is succinic acid or adipic acid.

14. A preparation process of claim 1 wherein the hydroxycarboxylic acid is an oligomer of the hydroxycarboxylic acid.

15. A preparation process of claim 1 wherein the hydroxycarboxylic acid is lactic acid.

16. An aliphatic polyester obtained by the preparation process of claim and having a weight average molecular weight of 15,000 or more.

17. An aliphatic polyester obtained by the preparation process of claim and having a weight average molecular weight of 50,000 or more.

18. A preparation process of claim 1 wherein the polycondensation reaction is carried out in the presence of a catalyst.

19. An aliphatic polyester obtained by the preparation process of claim 1 and having a Hazen number of 100 or less in the molten state.

* * * * *